United States Patent Office 3,488,349
Patented Jan. 6, 1970

---

3,488,349
ANTHRAQUINONE DYESTUFF
Rutger Neeff, Leverkusen, Germany, assignor to Farbenfabriken Bayer Aktiengesellschaft, Leverkusen, Germany, a corporation of Germany
No Drawing. Filed May 12, 1967, Ser. No. 637,892
Claims priority, application Germany, May 21, 1966,
F 49,252
Int. Cl. C09b 1/46; D06p 1/20, 3/24
U.S. Cl. 260—249       7 Claims

ABSTRACT OF THE DISCLOSURE

Dyestuff for dyeing and printing synthetic fiber materials which comprise triazine dyestuff of the authraquinone series wherein the triazine ring contains bis-phenylalkoxy substituents.

---

This invention relates to new anthraquinone dyestuffs and is especially concerned with their use for dyeing and printing synthetic fiber materials.

In our application, Ser. No. 510,693 filed Nov. 30, 1965, we have described and claimed anthraquinone dyestuffs useful for the dyeing and printing of synthetic fiber materials, said dyestuffs being of the formula:

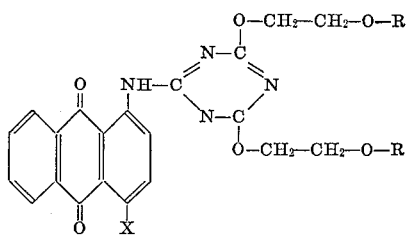

in which X stands for hydrogen or for a hydroxyl group, and R stands for a methyl or ethyl group.

We have now found as a result of further development work that valuable dyeings and prints on synthetic fiber materials are also obtained by using as dyestuffs the new compounds of the formula:

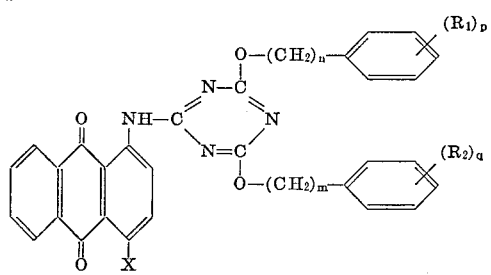

in which X stands for hydrogen, for a hydroxyl or lower alkoxy group, $R_1$ and $R_2$ stand for halogen, cyano, lower alkyl, lower alkoxy, or hydroxy lower alkoxy groups, $n$ and $m$ are integers from 1 to 3 inclusive, and $p$ and $q$ are integers from 0 to 2 inclusive; by "lower" is meant a content of 1 to 6 carbon atoms. By "halogen" is meant F, Cl, Br and I.

The dyestuffs according to the present invention can be obtained, for example, by the method described in Ser. No. 510,693.

Preferably linear aromatic polyesters are used as synthetic fibre materials, e.g. polyethylene terephthalates or polyesters obtained from 1,4-bis-(hydroxymethyl)-cyclohexane and terephthalic acid, but also fibre materials produced from polyamides, polyurethanes, polyacrylonitrile or cellulose triacetate.

Dyeing or printing can be carried out according to known methods. The dyestuffs are expediently used in a finely divided form. When polyethylene terephthalate fibres are dyed, the customary carriers may be added or dyeing may be effected at 120–145° C. under pressure. Dyeing or printing is preferably carried out according to the thermosol process in which the printed or padded fibre materials are briefly heated at temperatures of about 180–230° C., optionally after an intermediate drying. In general, heating takes place for periods of 30 seconds to 2 minutes.

The dyeings or prints obtained with the dyestuffs used according to the invention are distinguished by a very good texture, a high dye yield and outstanding fastness to light, thermofixing, washing, rubbing and ironing.

The parts given in the following examples are parts by weight, if not otherwise stated.

EXAMPLE 1

(a) A fabric of polyethylene terephthalate fibres is impregnated on the foulard with a liquor which contains, per litre, 20 g. 2,4-bis-(benzyloxy)-6-(1'-anthraquinonyl-amino)-1,3,5-triazine and 10 g. of a thermosol auxiliary, preferably a polyether. The fabric is then squeezed to a weight increase of 70% and dried in a suspension nozzle drier or a drying cabinet at 80–120° C. The fabric is subsequently subjected to a hot air treatment at 190–210° C. for about 45 seconds in a stenter or a nozzle hotflue, then rinsed, if necessary subjected to a reductive aftertreatment washed, rinsed and dried. The reductive aftertreatment in order to remove dyestuff particles superficially adhering to the fibres, can be carried out in such a manner that the fabric is introduced at 25° C. into a liquor containing 3–5 cc./litre of a sodium hydroxide solution of 38° Bé. and 1–2 g./litre concentrated hydrosulphite, the liquor is heated to 70° C. within about 15 minutes and kept at 70° C. for a further 10 minutes. The fabric is subsequently rinsed with hot water which is acidified with 2–3 cc./litre 85% formic acid at 50° C., again rinsed and dried.

A clear greenish yellow dyeing is obtained which is distinguished by its high dyestuff yield, very good texture and outstanding fastness properties, especially very good fastness to thermofixing, washing, rubbing and light.

An analogous dyeing is obtained when polyester fibres of 1,4-bis-(hydroxymethyl)-cyclohexane and terephthalic acid are used instead of polyethylene terephthalate fibres.

A clear greenish yellow dyeing is obtaining when, instead of polyethylene terephthalate fiibres, cellulose triacetate fibres are used and the thermosol process is carried out at 215° C., or when polyamide or polyurethane fibres are used and the thermosol process is carried out at 190–215° C.

(b) A previously cleaned and thermofixed fabric of polyethylene terephthalate fibres is printed with a printing paste which consists of 40 g. of the dyestuff mentioned in Example 1(a), 475 g. water, 465 g. crystal gum at a ratio of 1:2, and 20 g. sulphonated castor oil. The crystal gum may also be replaced by an alginate thickening. The printed and dried material is passed through a high-capacity stenter or through a condenation apparatus at 190–200° C. in order to fix the dyestuffs. The duration of this action lasts 30–60 seconds. The resultant fixed print is subsequently rinsed cold, soaped with 1–2 g./litre anionactive detergent at 70–80° C. for about 10 minutes, rinsed first hot then cold and dried.

A print which is analogous to the dyeing of Example 1(a) and is distinguished by the same outstanding fastness properties, is obtained.

A clear greenish yellow print is obtained in a similar manner when cellulose triacetate, polyamide or polyurethane fibres are used instead of polyethylene terephthalate fibres.

(c) 100 parts polyethylene terephthalate fibres are dyed in 4000 parts water at 100° C. for 1 hour and 30 minutes, at a pH of 4.5, with one part of the dyestuff mentioned in Example 1(a), converted into a finely divided form, in the presence of 15 parts o-cresotic acid methyl ester as carrier. A clear greenish yellow dyeing is obtained which is distinguished by very good fastness to washing, thermofixing and light. A similar dyeing is obtained when dyeing is carried out at 125–130° C. for one hour in the absence of a carrier.

When 100 parts cellulose triacetate are dyed in 3000 parts of water at 100° C. for one hour with 1 part of the dyestuff mentioned in Example 1(a) and converted into a finely divided form, a clear greenish yellow dyeing is also obtained which is distinguished by very good fastness to washing, thermofixing and light.

(d) The dyestuff mentioned in Example 1(a) can be prepared as follows: A solution of 21.6 parts 88.1% potassium hydroxide in 240 parts benzyl alcohol are mixed at room temperature, while stirring, with 60 parts 2,4-dichloro - 6-(1' - anthraquinonylamino) - 1,3,5-triazine, the temperature is allowed to rise to about 70–80° C. by an exothermal reaction, and stirring is continued until the dyestuff formation is completed. After cooling, the product, which crystallizes in the form of yellow prisms, is filtered off with suction, washed with water and, after drying, 79 parts 2,4 - bis - (benzyloxy) - 6 - (1' - anthraquinonylamino)-1,3,5 - triazine, corresponding to 95% of theory, are obtained.

Analysis.—Calculated for $C_{31}H_{22}N_4O_4$ (514.4): N, 10.88; O, 12.43. Found: N, 10.82; O, 12.47.

EXAMPLES 2 TO 10

Clear greenish yellow dyeings or prints with very good fastness to light, washing, rubbing and thermofixing are also obtained when polyethylene terephthalate, cellulose triacetate, polyamide or polyurethane fibres are dyed according to Example 1(a) or printed according to Example 1(b) with the following dyestuffs:

| Example | Dyestuff |
|---|---|
| 2 | 2,4-bis-(p-chlorobenzyloxy)-6-(1'-anthraquinonylamino)-1,3,5-triazine. |
| 3 | 2,4-bis-(p-bromobenzyloxy)-6-(1'-anthraquinonylamino)-1,3,5-triazine. |
| 4 | 2,4-bis-(m-fluorobenzyloxy)-6-(1'-anthraquinonylamino)-1,3,5-triazine. |
| 5 | 2,4-bis-(m-cyanobenzyloxy)-6-(1'-anthraquinonylamino)-1,3,5-triazine. |
| 6 | 2,4-bis-(p-methoxybenzyloxy)-6-(1'-anthraquinonylamino)-1,3,5-triazine. |
| 7 | 2,4-bis-(p-ethoxybenzyloxy)-6-(1'-anthraquinonylamino)-1,3,5-triazine. |
| 8 | 2,4-bis-(p-t-butylbenzyloxy)-6-(1'-anthraquinonylamino)-1,3,5-triazine. |
| 9 | 2,4-bis-(o-methylbenzyloxy)-6-(1'-anthraquinonylamino)-1,3,5-triazine. |
| 10 | 2,4-bis-(o,o'-dimethylbenzyloxy)-6-(1'-anthraquinonylamino)-1,3,5-triazine. |

The dyestuffs described in Examples 2 to 10 can be obtained according to the process of Example 1(d) by replacing the benzyl alcohol by an equivalent amount of the corresponding substituted benzyl alcohol.

EXAMPLE 11

(a) A fabric of polyethylene terephthalate fibres is dyed in accordance with Example 1(a) with a liquor containing, per litre, 20 g. 2,4-bis-(β-phenylethoxy)-6-(1'-anthraquinonylamino)-1,3,5-triazine, thus obtaining a clear greenish yellow dyeing which exhibits, besides a high dyestuff yield and a very good texture, outstanding fastness properties, especially very good fastness to thermofixing, washing, rubbing and light. Clear greenish yellow prints are obtained when polyethylene terephthalate fibres are printed with 2,4 - bis - (β - phenylethoxy) - 6 - (1' - anthraquinonylamino)-1,3,5-triazine according to Example 1(b), or when polyamide, polyurethane or cellulose triacetate fibres are used instead of polyethylene terephthalate fibres.

(b) The dyestuff mentioned in Example 11(a) can be prepared, for example, as follows: A solution of 21.6 parts 88.1% potassium hydroxide in 250 parts β-phenylethyl alcohol is mixed at room temperature, while stirring, with 60 parts 2,4-dichloro-6-(1'-anthraquinonylamino)-1,3,5-triazine, the temperature is allowed to rise to about 60 to 80° C. by an exothermal reaction, stirring is continued until the dyestuff formation is completed. After cooling, the product, which crystallises in the form of yellow prisms, is filtered off with suction, washed with water and, after drying, 84.2 parts 2,4-bis-(β-phenylethoxy) - 6 - (1' - anthraquinonylamino) - 1,3,5 - triazine, corresponding to 96% of theory, are obtained.

Analysis.—Calculated for $C_{33}H_{26}N_4O_4$ (542.5): N, 10.32; O, 11.78. Found: N, 10.28; O, 11.84.

EXAMPLES 12 TO 17

Clear greenish yellow dyeings and prints with excellent fastness properties are also obtained when polyethylene terephthalate, cellulose triacetate, polyamide or polyurethane fibers are dyed according to Example 1(a) or printed according to Example 1(b) with the following dyestuffs:

| Example | Dyestuff |
|---|---|
| 12 | 2,4-bis-(β-p-methylphenylethoxy)-6-(1'-anthraquinonylamino)-1,3,5-triazine. |
| 13 | 2,4-bis-(β-p-methoxyphenylethoxy)-6-(1'-anthraquinonylamino)-1,3,5-triazine. |
| 14 | 2,4-bis-(β-m-chlorophenylethoxy)-6-(1'-anthraquinonylamino)-1,3,5-triazine. |
| 15 | 2,4-bis-(γ-phenylpropoxy)-6-(1'-anthraquinonylamino)-1,3,5-triazine. |
| 16 | 2,4-bis-(γ-p-ethoxyphenylpropoxy)-6-(1'-anthraquinonylamino)-1,3,5-triazine. |
| 17 | 2,4-bis-(γ-m-bromophenylpropoxy)-6-(1'-anthraquinonylamino)-1,3,5-triazine. |

The dyestuffs described in Examples 12 to 17 can be obtained in accordance with the method of Example 11(b) by replacing the β-phenylethyl alcohol by equivalent amounts of the corresponding substituted β-phenylethyl alcohol or of the corresponding γ-phenylpropyl alcohol.

EXAMPLE 18

(a) A fabric of polyethylene terephthalate fibres is dyed according to Example 1(a) with a liquor containing, per litre, 20 g. of a mixture of 2,4-bis-(benzyloxy- and γ - phenylpropoxy) - 6 - (1' - anthraquinonylamino) - 1,3,5-triazine, thus obtaining a clear greenish yellow dyeing of an excellent dye yield and a very good texture and with outstanding fastness to thermofixing, washing, rubbing and light. Clear greenish yellow prints are also obtained when polyethylene terephthalate fibres are printed with the mentioned dyestuff mixture or when polyamide, polyurethane or cellulose triacetate fibres are used instead of polyethylene terephthalate fibres.

(b) The dyestuff mixture described in Example 18(a) is prepared, for example, as follows: A solution of 21.6 parts 88.1% potassium hydroxide in 120 parts benzyl alcohol and 135 parts γ-phenylpropyl alcohol is mixed at room temperature with 60 parts 2,4-dichloro-6-(1'-anthraquinonylamino)-1,3,5-triazine and stirring is continued until the exothermal reaction is completed. After cooling, the yellow product is filtered off with suction, washed with water and, after drying, there are obtained 83 parts of a mixture of 2,4-bis-(benzyloxy- and γ-phenylpropoxy)-6-(1'-anthraquinonylamino)-1,3,5-triazine.

EXAMPLE 19

(a) When a fabric of polyethylene terephthalate fibres is dyed according to Example 1(a) with a liquor containing, per litre, 20 g. 2,4-bis-(benzyloxy)-6-(4'-hydroxy-1'-anthraquinonylamino)-1,3,5-triazine, a brilliant yellowish red dyeing is obtained which, besides a high dyestuff yield, is distinguished by a very good texture and outstanding fastness to light, thermofixing, washing and ironing. Brilliant yellowish red prints or dyeings are also obtained when polyethylene terephthalate fibers are printed or dyed with the 2,4-bis-(benzyloxy)-6-(4'-hydroxy-1'-anthraquinonylamino)-1,3,5-triazine according to Example 1(b) or 1(c), or when polyamide, polyurethane or cellulose triacetate fibres are used instead of polyethylene terephthalate fibres.

(b) The dyestuff mentioned in this example can be prepared as follows: A solution of 6 parts sodium in 200 parts benzyl alcohol is mixed at 20 to 25° C. with 47 parts 2,4-dichloro-6-(4'-hydroxy-1'-anthraquinonylamino)-1,3,5-triazine and the mixture is heated at 100–125° C. for 1 hour. After cooling, the product, which crystallises in the form of orange-red prisms, is filtered off with suction, washed with methanol and water, and there are obtained 63.5 parts 2,4-bis-(benzyloxy)-6-(4'-hydroxy-1'-anthraquinonylamino)-1,3,5-triazine corresponding to 95.5% of theory.

Analysis.—Calculated for $C_{31}H_{22}N_4O_5$ (530.4): N, 10.53; O, 15.04. Found: N, 10.59; O, 15.01.

EXAMPLES 20 TO 33

Brilliant reddish yellow dyeings or prints with very good fastness to light, washing, rubbing and thermofixing are also obtained when polyethylene terephthalate, cellulose triacetate, polyamide or polyurethane fibres are dyed according to Example 1(a) or printed according to Example 1(b) with the following dyestuffs:

| Example | Dyestuff |
|---|---|
| 20 | 2,4-bis-(p-chlorobenzyloxy)-6-(4'-hydroxy-1'-anthraquinonylamino)-1,3,5-triazine. |
| 21 | 2,4-bis-(m-fluorobenzyloxy)-6-(4'-hydroxy-1'-anthraquinonylamino)-1,3,5-triazine. |
| 22 | 2,4-bis-(m-bromobenzyloxy)-6-(4'-hydroxy-1'anthraquinonylamino)-1,3,5-triazine. |
| 23 | 2,4-bis-(p-methoxybenzyloxy)-6-(4'-hydroxy-1'-anthraquinonylamino)-1,3,5-triazine. |
| 24 | 2,4-bis-(p-cyanobenzyloxy)-6-(4'-hydroxy-1'-anthraquinonylamino)-1,3,5-triazine. |
| 25 | 2,4-bis-(3',4'-dimethoxybenzyloxy)-6-(4'-hydroxy-1'-anthraquinonylamino)-1,3,5-triazine. |
| 26 | 2,4-bis-(p-γ-hydroxyethylbenzyloxy)-6-(4'-hydroxy-1'-anthraquinonylamino)-1,3,5-triazine. |
| 27 | 2,4-bis-(p-t-butylbenzyloxy)-6-(4'-hydroxy-1'-anthraquinonylamino)-1,3,5-triazine. |
| 28 | 2,4-bis-(3,4-methylene-dioxybenzyloxy)-6-(4'-hydroxy-1'-anthraquinonylamino)-1,3,5-triazine. |
| 29 | 2,4-bis-(β-phenylethoxy)-6-(4'-hydroxy-1'-anthraquinonylamino)-1,3,5-triazine. |
| 30 | 2,4-bis-(β-p-t-butylphenylethoxy)-6-(4'-hydroxy-1'-anthraquinonylamino)-1,3,5-triazine. |
| 31 | 2,4-bis-(β-m-bromophenylethoxy)-6-(4'-hydroxy-1'-anthraquinonylamino)-1,3,5-triazine. |
| 32 | 2,4-bis(γ-phenylpropoxy)-6-(4'-hydroxy-1'-anthraquinonylamino)-1,3,5-triazine. |
| 33 | 2,4-bis-(γ-p-methoxyphenylpropoxy)-6-(4'-hydroxy-1'-anthraquinonylamino)-1,3,5-triazine. |

The dyestuffs described in Examples 20 to 33 can be obtained according to the process of Example 19(b) by replacing the benzyl alcohol by the equivalent amounts of the corresponding substituted benzyl alcohol or phenylethanol or phenylpropanol.

EXAMPLE 34

(a) A fabric of polyethylene terephthalate fibres is dyed according to Example 1(a) with a liquor containing, per litre, 20 g. 2,4-bis-(benzyloxy)-6-(4'-methoxy-1'-anthraquinonylamino)-1,3,5-triazine. A clear orange-coloured dyeing is obtained which is distinguished by a high dyestuff yield, a vary good texture and outstanding fastness to light, thermofixing, washing and ironing. Clear orange-coloured prints and dyeings are obtained in a similar way when polyethylene terephthalate fibres are printed or dyed with the dyestuff according to Example 1(b) or 1(c) or when polyamide, polyurethane or cellulose triacetate fibres are used instead of polyethylene terephthalate fibres.

(b) The dyestuff mentioned in Example 34(a) can be obtained, for example, as follows: A solution of 21.6 parts 88.1% potassium hydroxide in 240 parts benzyl alcohol is mixed at room temperature with 64.8 parts 2,4-dichloro-6-(4'-methoxy-1 - anthraquinonylamino) - 1,3,5-triazine and the melt is stirred until the exothermal reaction subsides. The dyestuff, which crystallises in the form of orange-coloured prisms, is filtered off with suction and, after drying, 85 parts 2,4-bis-(benzyloxy-6-(4'-methoxy-1'-anthraquinonylamino)-1,3,5-triazine, corresponding to 96.5% of theory, are obtained.

Analysis.—Calculated for $C_{33}H_{24}N_4O_5$ (544.5): N, 10.28; O, 14.68. Found: N, 10.21; O, 14.72

EXAMPLES 35 TO 50

Clear orange-coloured dyeings and prints with very good fastness to light, washing, rubbing and thermofixing are also obtained when polyethylene terephthalate, cellulose triacetate, polyamide or polyurethane fibres are dyed according to Example 1(a) or printed according to Example 1(b) with the following dyestufs.

| Example | Dyestuff |
|---|---|
| 35 | 2,4-bis-(m-chlorobenzyloxy)-6-(4'-methoxy-1-anthraquinonylamino)-1,3,5-triazine. |
| 36 | 2,4-bis-(p-fluorobenzyloxy)-6-(4'-methoxy-1-anthraquinonylamino)-1,3,5-triazine. |
| 37 | 2,4-bis-(p-bromobenzyloxy)-6-(4'-methoxy-1-anthraquinonylamino)-1,3,5-triazine. |
| 38 | 2,4-bis-(m-methoxybenzyloxy)-6-(4'-methoxy-1-anthraquinonylamino)-1,3,5-triazine. |
| 39 | 2,4-bis-(m-cyanobenzyloxy)-6-4'-methoxy-1-anthraquinonylamino)-1,3,5-triazine. |
| 40 | 2,4-bis-(3',4'-dimethoxybenzyloxy)-6-(4'-methoxy-1-anthraquinonylamino)-1,3,5-triazine. |
| 41 | 2,4-bis-(p-β-hydroxyethoxybenzyloxy)-6-(4'-methoxy-1-anthraquinonylamino)-1,3,5-triazine. |
| 42 | 2,4-bis-(p-methylbenzyloxy)-6-(4'-methoxy-1-anthraquinonylamino)-1,3,5-triazine. |
| 43 | 2,4-bis-(β-phenylethoxy)-6-(4'-methoxy-1-anthraquinonylamino)-1,3,5-triazine. |
| 44 | 2,4-bis-(γ-phenylpropoxy)-6-(4'-methoxy-1-anthraquinonylamino)-1,3,5-triazine. |
| 45 | 2,4-bis-(benzyloxy)-6-(4'-ethoxy-1-anthraquinonylamino)-1,3,5-triazine |
| 46 | 2,4-bis-(β-phenylethoxy)-6-(4'-ethoxy-1-anthraquinonylamino)-1,3,5-triazine. |
| 47 | 2,4-bis-(γ-phenylpropoxy)-6-(4'-ethoxy-1-anthraquinonylamino)-1,3,5-triazine. |
| 48 | 2,4-bis-(benzyloxy)-6-(4'-propoxy-1-anthraquinonylamino)-1,3,5-triazine. |
| 49 | 2,4-bis-(β-phenylethoxy)-6-(4'-propoxy-1-anthraquinonylamino)-1,3,5-triazine. |
| 50 | 2,4-bis-(γ-phenylpropoxy)-6-(4'-propoxy-1-anthraquinonylamino)-1,3,5-triazine. |

The dyestuffs described in Examples 35 to 50 can be obtained according to the process of Example 34(b) when, instead of the benzyl alcohol, the equivalent amounts of the corresponding substituted benzyl alcohol, phenylethanol or phenylpropanol are used or when the triazine used in Example 34(b) is replaced by the corresponding substituted triazine.

What I claim is:

1. Anthroquinone dyestuff of the formula

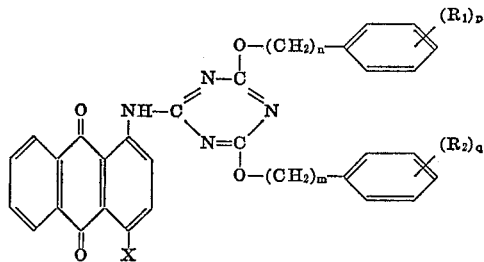

in which X stands for hydrogen, for a hydroxyl or lower alkoxy group, $R_1$ and $R_2$ stand for halogen, cyano, lower alkyl, lower alkoxy, or hydroxy lower alkoxy groups, $n$ and $m$ are integers from 1 to 3 inclusive, and $p$ and $q$ are integers from 0 to 2 inclusive.

2. Dyestuff of claim 1 having the formula:

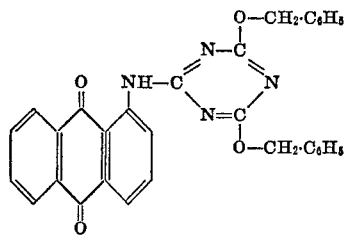

3. Dyestuff of claim 1 having the formula:
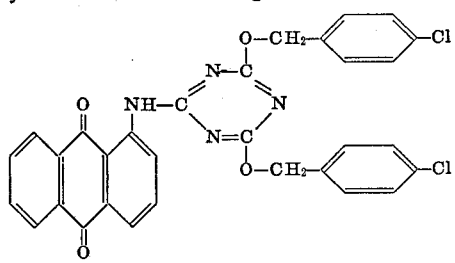
4. Dyestuff of claim 1 having the formula:
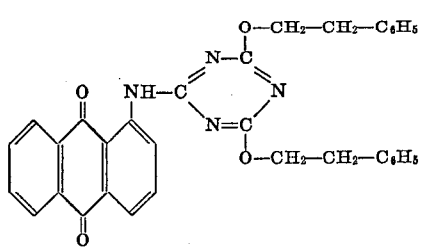
5. Dyestuff of claim 1 having the formula:
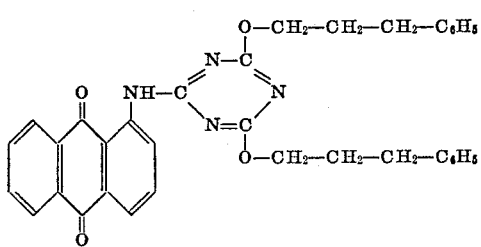
6. Dyestuff of claim 1 having the formula:
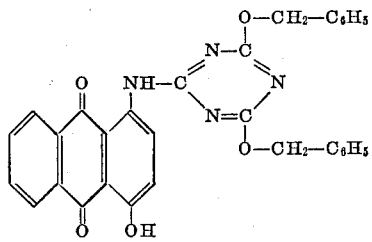
7. Dyestuff of claim 1 having the formula:
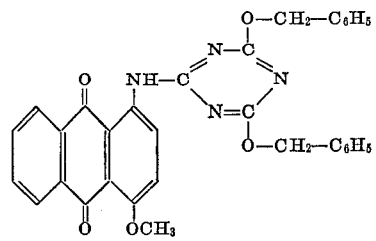
References Cited
UNITED STATES PATENTS
| | | | |
|---|---|---|---|
| 2,742,466 | 4/1956 | Randall et al. | 260—249.5 |
| 2,846,397 | 8/1958 | Ackermann | 260—249.5 XR |
| 3,156,689 | 11/1964 | Dexter et al. | 260—249.5 XR |
| 3,349,089 | 10/1967 | Kazankov et al. | 260—249 |
GEORGE F. LESMES, Primary Examiner
P. C. IVES, Assistant Examiner
U.S. Cl. X.R.
8—39, 40, 55